(12) United States Patent
Mirovics et al.

(10) Patent No.: US 6,482,366 B1
(45) Date of Patent: Nov. 19, 2002

(54) CALCINATION USING LIQUID METAL HEAT EXCHANGE FLUID

(75) Inventors: Ivars Mirovics, Mordialloc (AU); Malcolm Timothy Frost, Kenmore (AU); Raymond Louis Koenig, Fig Tree Pocket (AU); Peter James Tait, Moorooka (AU)

(73) Assignees: Commonwealth Scientific and Industrial Research Organisation, Campbell (AU); Australian Magnesium Corporation PTY LTD, Toowong (AU)

( * ) Notice: Subject to any disclaimer, the term of this patent is extended or adjusted under 35 U.S.C. 154(b) by 0 days.

(21) Appl. No.: 09/091,957
(22) PCT Filed: Jan. 17, 1997
(86) PCT No.: PCT/AU97/00021
§ 371 (c)(1), (2), (4) Date: Mar. 25, 1999
(87) PCT Pub. No.: WO97/26077
PCT Pub. Date: Jul. 24, 1997

(30) Foreign Application Priority Data

Jan. 17, 1996 (AU) ............................................. PN7584

(51) Int. Cl.$^7$ ............................... B01J 6/00; B01J 8/18; F27B 7/02; F27B 13/12; C22B 26/22
(52) U.S. Cl. ........................ 422/146; 422/139; 422/198; 422/200; 423/498
(58) Field of Search ........................ 127/23; 165/104.14, 165/1; 422/146, 200, 202, 139, 198; 423/498, 497, 155

(56) References Cited

U.S. PATENT DOCUMENTS

| | | | | |
|---|---|---|---|---|
| 3,967,975 A | * | 7/1976 | Idaszak | 127/23 |
| 4,164,253 A | * | 8/1979 | Skala | 165/104.14 |
| 4,546,608 A | * | 10/1985 | Shiina et al. | 60/649 |
| 5,439,563 A | * | 8/1995 | Sivilotti | 205/404 |
| 5,514,359 A | * | 5/1996 | Sivilotti et al. | 423/498 |

* cited by examiner

Primary Examiner—Hien Tran
(74) Attorney, Agent, or Firm—Rodman & Rodman

(57) ABSTRACT

An apparatus (10) for calcining a material comprises a calcination vessel (10) which houses a heat exchanger (12). The heat exchanger (12) is arranged to transfer heat to the material from a liquid metal heat exchange fluid arranged to flow through the heat exchanger (12).

22 Claims, 11 Drawing Sheets

CALCINATION USING LIQUID METAL HEAT EXCHANGE FLUID

This application claims priority of PCT/AU97/00021 filed Jan. 17, 1997 and Australian Patent Application No. PN7584 filed Jan. 17, 1996

FIELD OF THE INVENTION

The present invention relates generally to calcination and, more particularly, to indirectly heated calcination. Calcination is the process of subjecting a material to prolonged heating at fairly high temperatures.

BACKGROUND OF THE INVENTION

In directly heated calcination, the material to be calcined is exposed to the source of heat, for example, the calcination of $Al(OH)_3$ to $Al_2O_3$ in which $Al(OH)_3$ is directly heated by combustion of oil, gas or coal. In indirectly heated calcination, the material to be calcined is isolated from the source of heat. Typically the material to be calcined is contained within a cylindrical retort which is rotated within a stationary refractory lined cylindrical furnace with combustion of fuel occurring within the annular ring between the retort and the furnace. Such calciners have been used for activating wood charcoal, reducing mineral high oxides to low oxides, drying fluoride precipitates in a hydrogen fluoride atmosphere, calcination of silica gel, drying and removal of sulphur from cobalt, copper and nickel, reduction of metal oxides, oxidising of organic impurities, and reclamation of foundry sand.

The present invention is not concerned with directly heated calcination and, in contrast to known indirectly heated calcination processes, the present invention is concerned with indirectly heated calcination in which the material to be calcined is contained within a calcination vessel and is heated by heat transferred from a liquid metal flowing through a heat exchanger within the calcination vessel. The present invention is applicable to both processes in which a fluidised bed of the material to be calcined is formed within the calcination vessel and to processes in which fluidisation is not utilised, for example, indirectly heated rotating drum calcination. The present invention is also applicable to processes in which the pressure within the calcination vessel is atmospheric, greater than atmospheric, or less than atmospheric.

SUMMARY OF THE INVENTION

In a first aspect, the present invention provides an apparatus for calcining a material, the apparatus comprising a calcination vessel which houses a heat exchanger arranged to transfer heat to the material from a liquid metal heat exchange fluid arranged to flow through the heat exchanger.

The apparatus according to the first aspect of the present invention may comprise a single calcination vessel. Alternatively, the apparatus may comprise a series of calcination vessels, each of the series of calcination vessels being arranged to partially calcine the material. Typically, the series of calcination vessels will comprise two or three calcination vessels.

In a second aspect, the present invention provides a process for calcining a material in an apparatus according to the first aspect of the present invention, the process comprising transferring heat to the material from a liquid metal heat exchange fluid flowing through the heat exchanger within the calcination vessel.

Where the apparatus according to the first aspect of the present invention comprises a single calcination vessel, the process according to the second aspect of the present invention is a single-stage calcination process and where the apparatus comprises a series of calcination vessels, the process is a multi-stage calcination process.

In a third aspect, the present invention provides material calcined by a process according to the second aspect of the present invention.

Liquid metals suitable for use in the present invention are characterised by having relatively low melting points, relatively high boiling points, relatively high heat transfer coefficients, relatively high specific heats and relatively low viscosities. Such liquid metals include sodium, potassium, magnesium, lead, tin, mercury and alloys thereof. A sodium-potassium alloy comprising 22% by weight sodium and 78% by weight potassium is an example of a suitable liquid metal alloy.

The heat exchanger(s) housed within the calcination vessel(s) may form part of a closed loop with the liquid metal heated externally of the calcination vessel(s) by heating means.

Liquid metals such as sodium and potassium are very reactive and hence for safety reasons the liquid metal is isolated from the atmosphere and other sources of reactant. The liquid metal may therefore be caused to flow through the heat exchange loop by use of one or more mechanical or electromagnetic pumps.

Liquid metals are electrical conductors and hence can be forced to flow under the influence of a magnetic field when a current is passed through the liquid metal normal to the direction of the magnetic field. Force is exerted on the liquid metal in a direction normal to both the magnetic field and the current flow. For example, a portion of the heat exchange loop may be passed horizontally between the poles of an electromagnet (arranged to impart a vertically orientated magnetic field) with an externally sourced current passed horizontally across the liquid metal in the magnetic field in a direction normal to the desired direction of flow of the liquid metal. Electromagnetic pumps are advantageous because they do not have any moving parts.

Preferably, the liquid metal is caused to flow through the heat exchange loop by being passed through one or more centrifugal pumps. Centrifugal pumps are preferred to electromagnetic pumps because centrifugal pumps are more efficient and are capable of pumping greater volumes. However, high operating temperatures necessitate careful design of centrifugal pumps used for pumping liquid metal. Factors to be considered in the design of a centrifugal pump for pumping liquid metal include the dissipation of heat from the pump, the expansion of components of the pump, the critical speed of rotation of the shaft, operation of the bearing in liquid metal, and sealing of the shaft to prevent leakage of liquid metal.

In either case, it is preferred that the pump or pumps are located at the coolest point in the heat exchange loop, for example, between the exit of the heat exchanger of a single-stage calcination process and the point where the liquid metal is heated.

As an alternative to a pump, a thermosiphon may be used to induce flow of a liquid metal through the heat exchange loop. Thermosiphon circulation can be induced provided that there is a sufficient difference in density between the hot and cool portions of the liquid metal.

The heat exchanger may take a variety of forms. The heat exchanger may simply be a pipe passing through the calcination vessel. However, to increase the transfer of heat to the material within the calcination vessel, it is preferred that the heat exchanger is arranged to maximise the surface area for heat transfer. The heat exchanger may take the form of a pipe or pipes having a serpentine passage through the calcination vessel. Alternatively, the heat exchanger may take the form of a series of pipes which are connected by manifolds or pigtails.

As an alternative to a heat exchange loop through which the liquid metal is pumped, the liquid metal may be contained within one or more heat pipes. Each pipe is part of a closed, normally evacuated, system which protrudes within the calcination vessel as the heat exchanger. Heat is supplied to a portion of the system external to the calcination vessel. For example, a heat pipe may take the form of a connecting pipe passing through the bottom of the calcination vessel which joins a base portion to a heat exchange portion. Heat may be applied to the base portion from an external source, for example, by combustion of gas or the like, resulting in heating of the contained liquid metal so as to generate a vapour and passage of the metal vapour through the connecting pipe to the heat exchange portion where the vapour condenses on the walls of the heat exchange portion with heat transferred to the material within the calcination vessel. On cooling, the liquid metal in the heat exchange portion returns through the connecting pipe to the base portion where it is again heated to vapour. A convection flow of liquid metal and vapour is thus created in the heat pipe with the heat from the vapour being transferred to the walls of the heat exchange portion and subsequently to the material in the calcination vessel. Heat pipes are advantageous because no pumping of the liquid metal is required.

One application of the present invention is the calcination of magnesium chloride hexammoniate ($MgCl_2.6NH_3$) to anhydrous magnesium chloride ($MgCl_2$). The present invention will hereafter be described in relation to such application but it is to be expressly understood that the present invention is not restricted to such application.

Magnesium metal can be electrolytically produced from $MgCl_2$ and $MgCl_2$ can be produced by calcination of $MgCl_2.6NH_3$ with liberation of ammonia ($NH_3$). Calcination of $MgCl_2.6NH_3$ for subsequent production of magnesium metal is problematic for a number of reasons.

A large quantity of heat is required because $MgCl_2.6NH_3$ must be calcined at high temperature, for example, in the order of 480° C. to produce $MgCl_2$.

Directly heated calcination is not feasible because of the level of purity required of the product $MgCl_2$.

Commercial production of magnesium metal by electrolysis of $MgCl_2$ requires the calcination of large quantities of $MgCl_2.6NH_3$.

The calcination environment is corrosive and hence the calcination vessel must be manufactured from expensive materials to limit contamination of the product $MgCl_2$.

The calcination process is a pressurised process.

Long residence times in the calcination vessel are undesirable due to the increased likelihood of contamination.

For $MgCl_2$ to be produced from $MgCl_2.6NH_3$, 6 molecules of $NH_3$ must be removed from each molecule of $MgCl_2.6NH_3$. In a single-stage calcination process according to the second aspect of the present invention, the calcination reaction is:

$$MgCl_2.6NH_3 \rightarrow MgCl_2 + 6NH_3$$

with sufficient energy being required within the calcination vessel to remove all 6 molecules of $NH_3$.

A multi-stage calcination process according to the second aspect of the present invention is advantageous because overall less energy and heat exchange area is required. By way of example, a two-stage calcination process may be represented as $$MgCl_2.6NH_3 \rightarrow MgCl_2.2NH_3 + 4NH_3 \quad \text{Stage One}$$

$$MgCl_2.2NH_3 \rightarrow MgCl_2 + 2NH_3 \quad \text{Stage Two}$$

and a three-stage calcination process may be represented as $$MgCl_2.6NH_3 \rightarrow MgCl_2.2NH_3 + 4NH_3 \quad \text{Stage One}$$

$$MgCl_2.2NH_3 \rightarrow MgCl_2.NH_3 + NH_3 \quad \text{Stage Two}$$

$$MgCl_2.NH_3 \rightarrow MgCl_2 + NH_3. \quad \text{Stage Three}$$

$MgCl_2$ is preferably produced from $MgCl_2.6NH_3$ in a single-stage or multi-stage fluidised bed calcination process with $NH_3$ utilised as a fluidising gas. High purity of the product $MgCl_2$ is highly desirable because the presence of contaminants can adversely affect the electrolytic production of magnesium metal from $MgCl_2$. It is therefore preferred that at least the interior of the calcination vessel(s) and the exterior of the heat exchanger(s) are manufactured from a material which will introduce a minimum of contaminants and which will resist deterioration. Stainless steel is preferably not used because of the possibility of loss of metal or deterioration in its properties at operating temperatures. It is therefore preferred to use special alloys such as INCONEL 600 or INCONEL 601 which exhibit high corrosion resistance, strength and stability at high temperature. Alternatively, the calcination vessel(s) may be manufactured from carbon steel and internally lined with insulating ceramic bricks or refractory.

As previously mentioned, the heat exchanger(s), housed within the calcination vessel(s) may form part of a closed loop with the liquid metal heated externally of the calcination vessel(s) by heating means. In such a case it is preferred to manufacture those portions of the heat exchange loop external to the calcination vessel(s) from a material such as stainless steel to minimise costs. The liquid metal may be heated by routing the heat exchange loop through heating means in the form of one or more hydrocarbon fuel fired boilers or electric heaters. The temperature within the calcination vessel of a single-stage calcination process or within the final calcination vessel of a multi-stage calcination process is preferably in the range 460–500° C., more preferably about 480° C. For a single-stage calcination process the liquid metal preferably enters the heat exchanger at a temperature in the order of 700° C. and exits the heat exchanger at a temperature in the order of 550° C., whereafter it is heated to approximately 700° C. prior to again entering the heat exchanger.

For a two-stage calcination process the liquid metal preferably enters the heat exchanger of the first calcination vessel at a temperature in the order of 550° C. and exits at a temperature in the order of 300° C. which is believed to provide a temperature within the first calcination vessel in the range of 210–230°, preferably about 220° C. A calcination temperature of approximately 220° C. is believed to be sufficient to remove 4 molecules of $NH_3$ from a molecule of $MgCl_2.6NH_3$ in accordance with the following reaction:

$$MgCl_2.6NH_3 \rightarrow MgCl_2.2NH_3 + 4NH_3.$$

The liquid metal is preferably heated to approximately 700° C. between the first and second calcination vessels prior to entering the heat exchanger of the second calcination vessel where the final two molecules of $NH_3$ are believed to be removed in accordance with the following reaction:

$$MgCl_2 \cdot 2NH_3 \rightarrow MgCl_2 + 2NH_3.$$

The liquid metal preferably exits the heat exchanger of the second calcination vessel at approximately 550° C. whereafter it is preferably returned to the heat exchanger of the first calcination vessel for the heating cycle to be repeated.

In the two-stage calcination process referred to above, preferably, $MgCl_2$ is continuously withdrawn from the second calcination vessel, $MgCl_2 \cdot 6NH_3$ is continuously introduced into the first calcination vessel, and $MgCl_2 \cdot nNH_3$ (where n is approximately 2) is continuously transferred from the first calcination vessel to the second calcination vessel.

In a similar manner to that described above for a two-stage calcination process, $MgCl_2 \cdot 6NH_3$ may be calcined to $MgCl_2$ in a three-stage calcination process in accordance with the following reactions:

$$MgCl_2 \cdot 6NH_3 \rightarrow MgCl_2 \cdot 2NH_3 + 4NH_3 \rightarrow MgCl_2 \cdot NH_3 + NH_3 \rightarrow MgCl_2 + NH_3.$$

Multi-stage calcination is preferred to single-stage calcination because:

(a) the cumulative surface area of the heat exchangers can be reduced as compared with the surface area of a single-stage heat exchanger;

(b) lower liquid metal exit temperature from the heat exchanger of the first calcination vessel as compared with the liquid metal exit temperature from the heat exchanger of a single calcination vessel enables pumping, flow measuring and controlling of the liquid metal to be conducted at lower temperature, thus allowing less expensive equipment to be used;

(c) in multi-stage calcination, a larger overall temperature difference of the circulating liquid metal enables a smaller capacity pump to be used; and (d) multi-stage calcination enables higher efficiency in the heating of the liquid metal.

BRIEF DESCRIPTION OF DRAWINGS

Preferred embodiments of the present invention will now be described, by way of example only, with reference to the accompanying drawings in which.

DETAILED DESCRIPTION OF DRAWINGS

Figure 1:
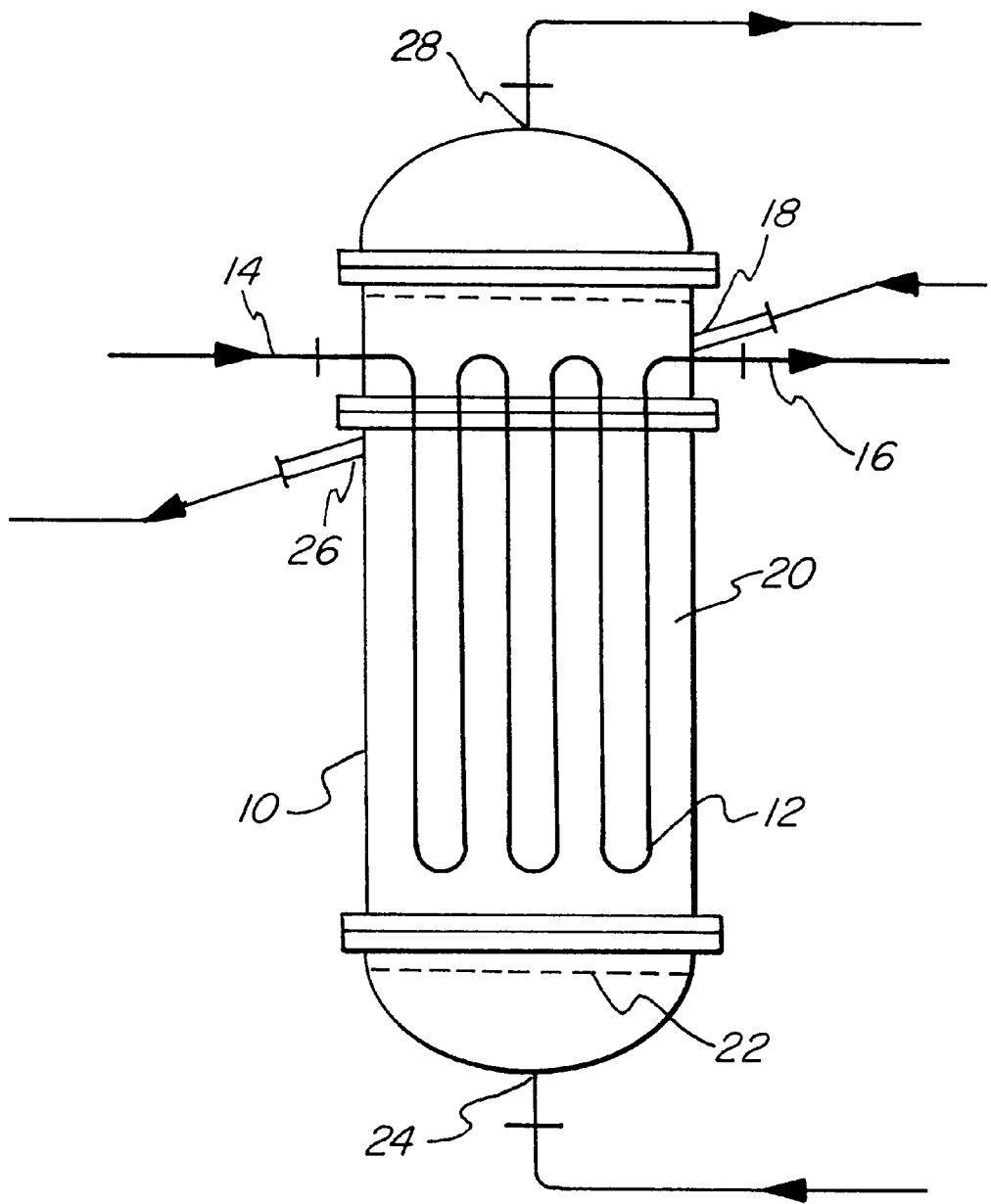
FIG. 1 is a schematic representation of a calcination vessel for single-stage calcination of $MgCl_2 \cdot 6NH_3$ to $MgCl_2$ which contains a serpentine heat exchanger.

Referring firstly to FIG. 1, the calcination vessel 10 is configured for calcination of approximately 15.7T/hour of $MgCl_2 \cdot 6NH_3$ yielding approximately 7.9T/hour of $MgCl_2$.

The calcination vessel 10 is manufactured from 4 mm thick INCONEL 600, has a diameter of approximately 3,500 mm and a height of approximately 9,000 mm. The calcination vessel 10 houses a heat exchanger 12 in the form of a serpentine path of INCONEL 600 tube having an outside diameter of 101.6 mm and a wall thickness of 3.05 mm. Sodium (Na) enters the heat exchanger 12 from stainless steel tube 14 at an entry temperature of approximately 700° C., flows through the heat exchanger 12 and exits the calcination vessel 10 to flow through stainless steel tube 16 at an exit temperature of approximately 550° C. Stainless steel tubes 14 and 16 are welded to the INCONEL 600 heat exchanger 12. $MgCl_2 \cdot 6NH_3$ is introduced into the calcination vessel 10 via entry port 18 by conventional pneumatic particle transfer techniques at a rate of approximately 15.7T/hour. A fluidised bed 20 is formed above fluidisation grid 22 with $NH_3$ fluidising gas entering the base of calcination vessel 10 via entry port 24. Heat transferred to the fluidised bed 20 from flow of Na through the heat exchanger 12 elevates the temperature of the fluidised bed 20 to approximately 480° C. Calcination of the $MgCl_2 \cdot 6NH_3$ yields approximately 7.9T/hour of product $MgCl_2$ and approximately 7.8T/hour of $NH_3$ which exit the calcination vessel 10 via exit ports 26 and 28 respectively. The product $MgCl_2$ is withdrawn via exit port 26 using conventional pneumatic particle transfer techniques. The $NH_3$ generated by calcination of the $MgCl_2 \cdot 6NH_3$ is available for reuse, together with the $NH_3$ introduced via entry port 24 as fluidising gas.

Figure 2:
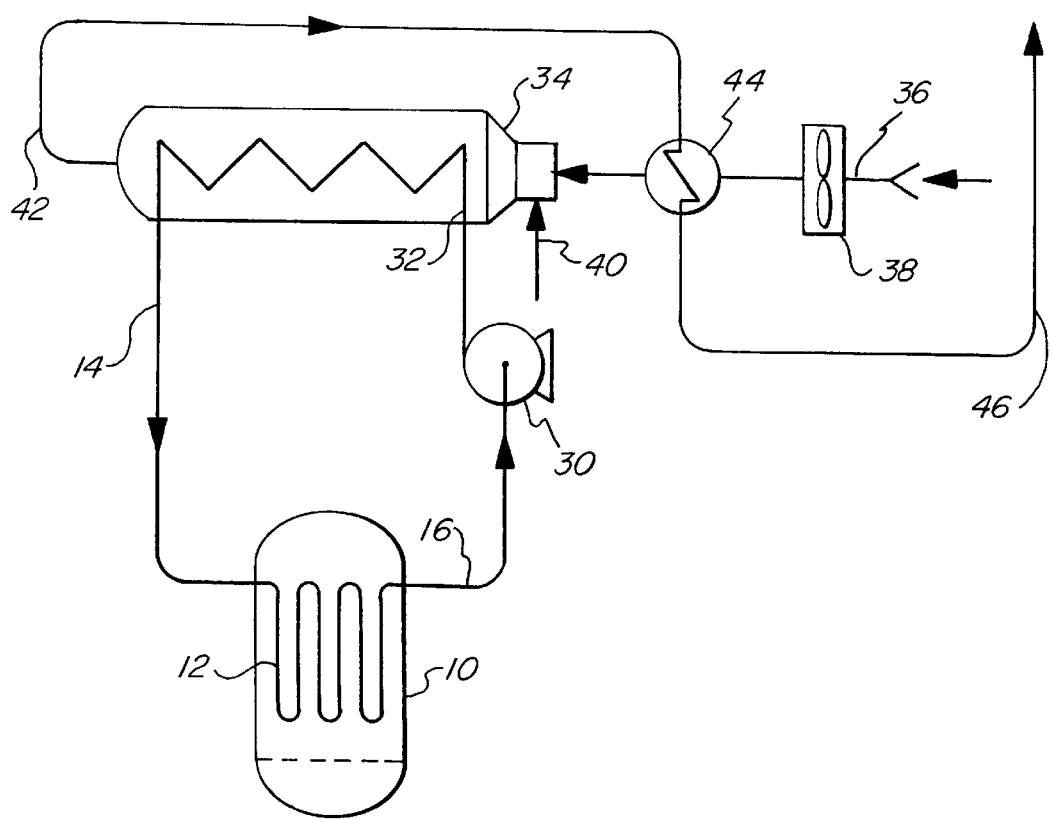
FIG. 2 is a schematic representation of the calcination vessel of FIG. 1 and an associated gas fired heater.

Referring now to FIG. 2, a calcination vessel 10 of the kind described with reference to FIG. 1 houses a heat exchanger 12 through which liquid Na flows. The Na is circulated through a heat exchange loop by a 30 HP centrifugal pump 30. The heat exchange loop consists of heat exchanger 12, stainless steel tube 16, centrifugal pump 30, stainless steel tubing 32 passing through gas-fired heater 34 and stainless steel tube 14 which returns the Na to heat exchanger 12. The pump 30 is located between the calcination vessel 10 and the heater 34 which is the coolest point in the heat exchange loop. The Na is approximately 550° C. at pump 30 and is heated to approximately 700° C. during passage through heater 34. The heater 34 is of conventional design with air introduced through line 36 by motion of fan 38 and gas introduced through line 40. Waste heat exiting heater 34 via line 42 passes through heat exchanger 44 to preheat incoming air prior to being exhausted via line 46.

The present invention is restricted to use of a liquid metal as a heat exchange fluid. The following table demonstrates advantages of an embodiment of the present invention similar to that described in relation to FIG. 2 (ie. single-stage fluidised bed calcination) as compared with an equivalent single-step fluidised bed arrangement in which air is utilised as the heat exchange fluid in the calcination of approximately 15.7T/hour of $MgCl_2 \cdot 6NH_3$. In both cases, the.

calcination vessel and heat exchanger are manufactured from INCONEL 600 to reduce contamination of product $MgCl_2$.

| HEAT EXCHANGE FLUID | SODIUM | AIR |
|---|---|---|
| Diameter of calcination vessel (mm) | 4500 | 6100 |
| Wall thickness of calcination vessel (mm) | 4 | 6 |
| Surface area of heat exchanger (arbitrary unit) | 1 | 10 |
| Estimated residence time of $MgCl_2.6NH_3$ (hours) (see Note A) | 2 | 18 |
| Estimated heat input to the heat exchange fluid (MW) | 25 | 30 |
| Estimated cost to heat the heat exchange fluid ($M/annum) | 0.60 | 0.72 |
| Estimated cost to circulate the heat exchange fluid ($K/annum) (See Note B) | 10 | 680 |
| Flow rate of the heat exchange fluid (kg/sec) | 62 | 72 |

Note A: Minimum residence time is desirable because of reduction in the likelihood of contamination of product $MgCl_2$.
Note B: The large cost difference is a consequence of the need to operate a very large electric fan to circulate hot air as the heat exchange fluid as compared with a pump in the case of sodium.

Figure 3:
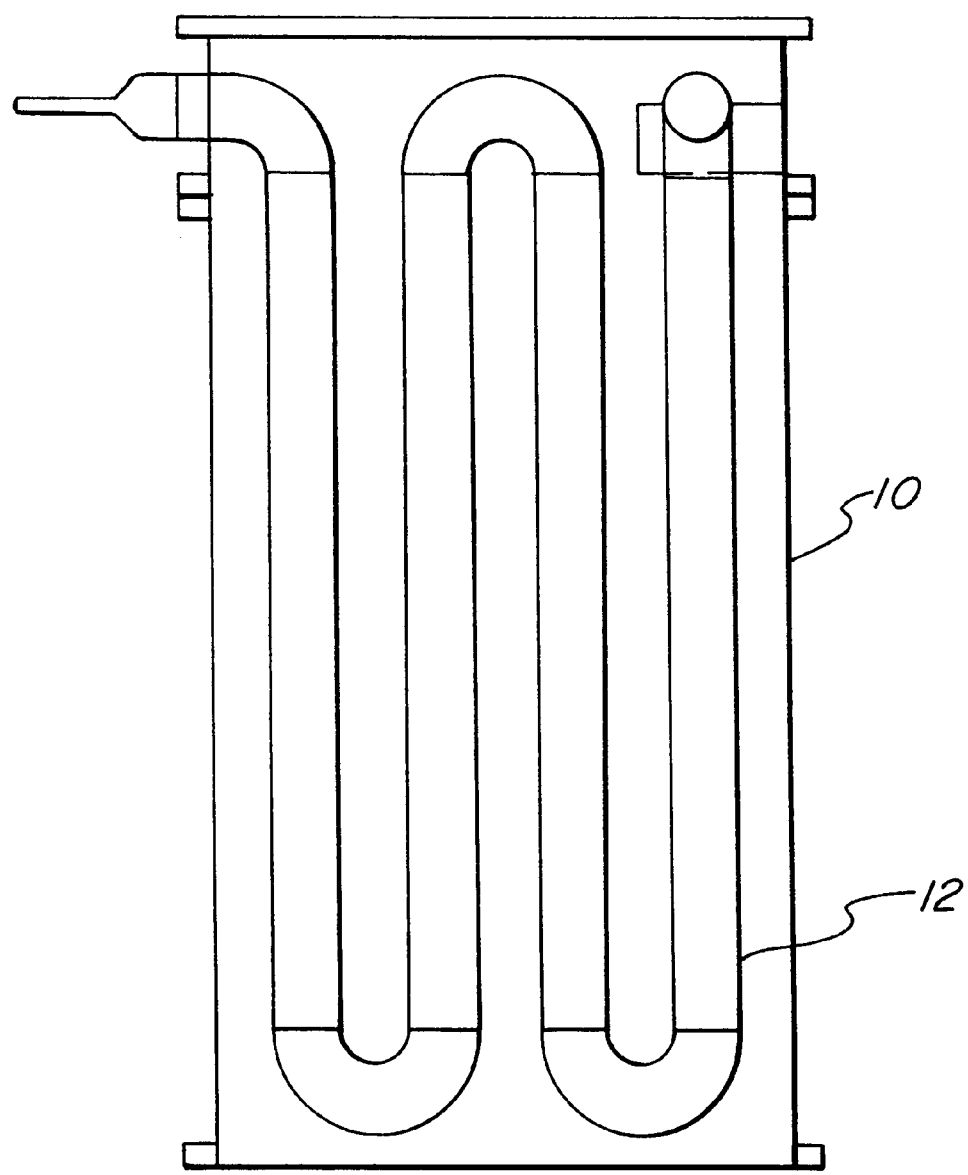
FIG. 3 is a partially schematic cross-sectional elevation of a serpentine heat exchanger within a calcination vessel.
Figure 4:
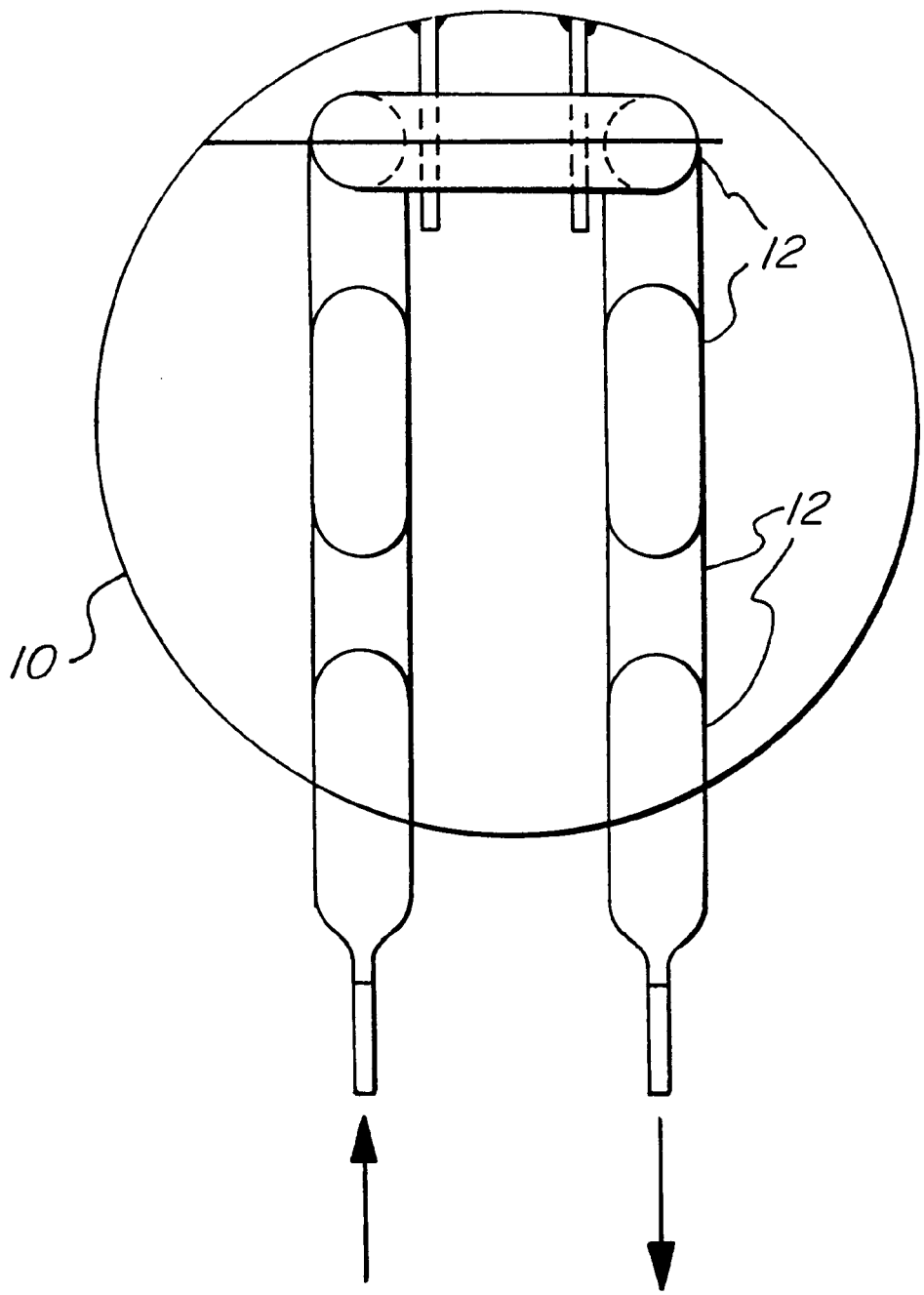
FIG. 4 is a partially schematic plan view of the heat exchanger and calcination vessel of FIG. 3.
Figure 5:
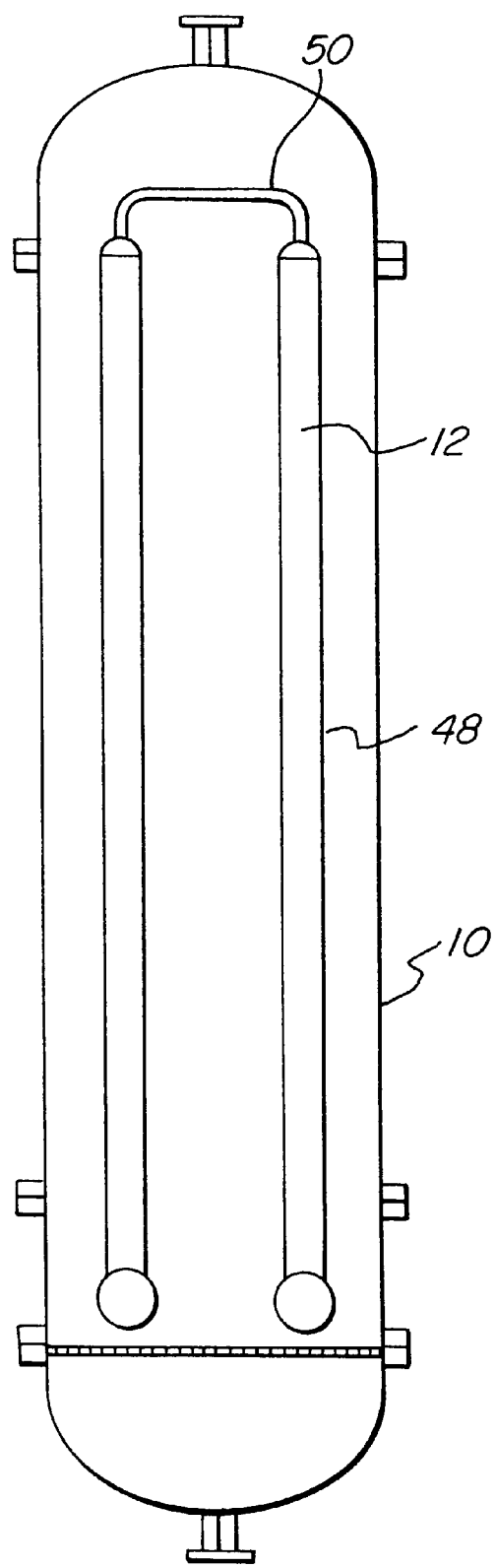
FIG. 5 is a partially schematic cross-sectional elevation of a manifolded heat exchanger within a calcination vessel.
Figure 6:
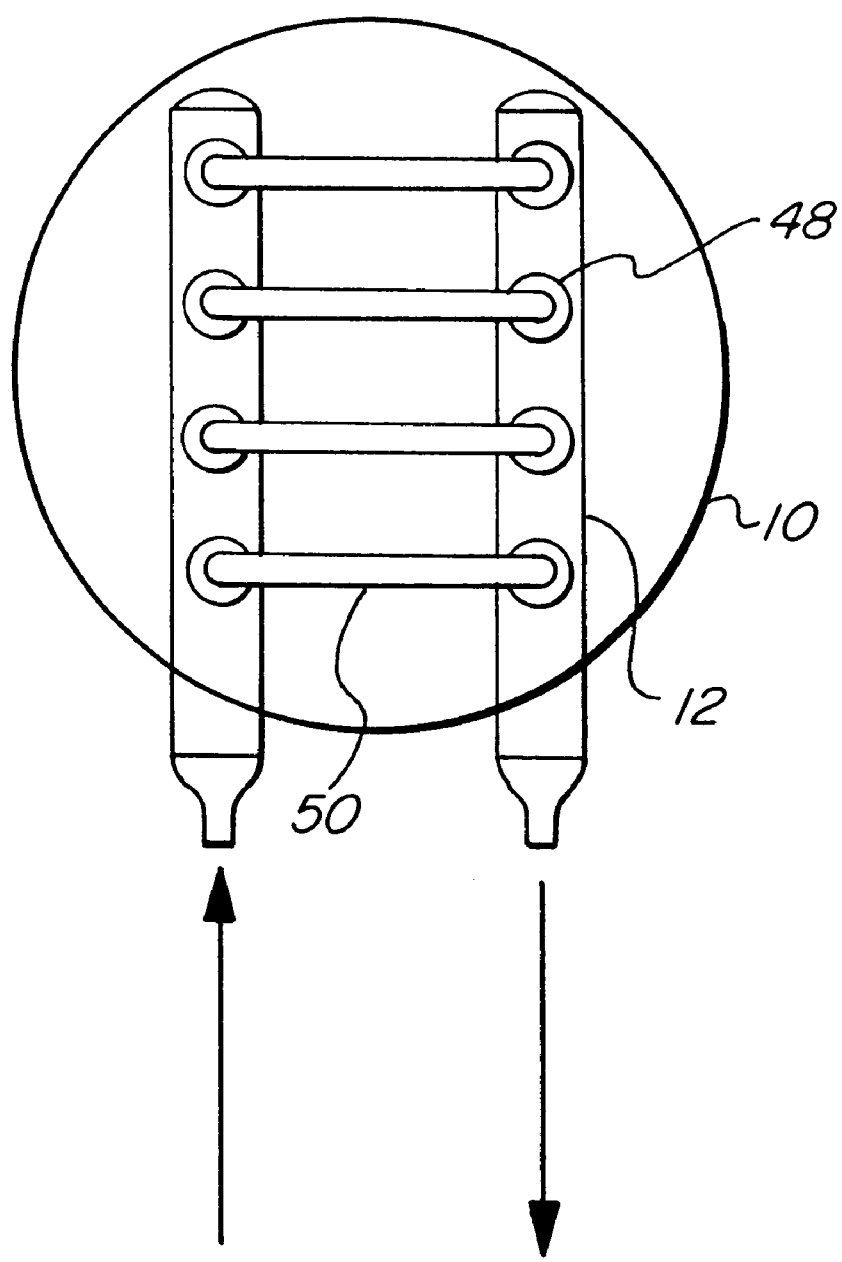
FIG. 6 is a partially schematic plan view of the heat exchanger and calcination vessel of FIG. 5.
Figure 7:
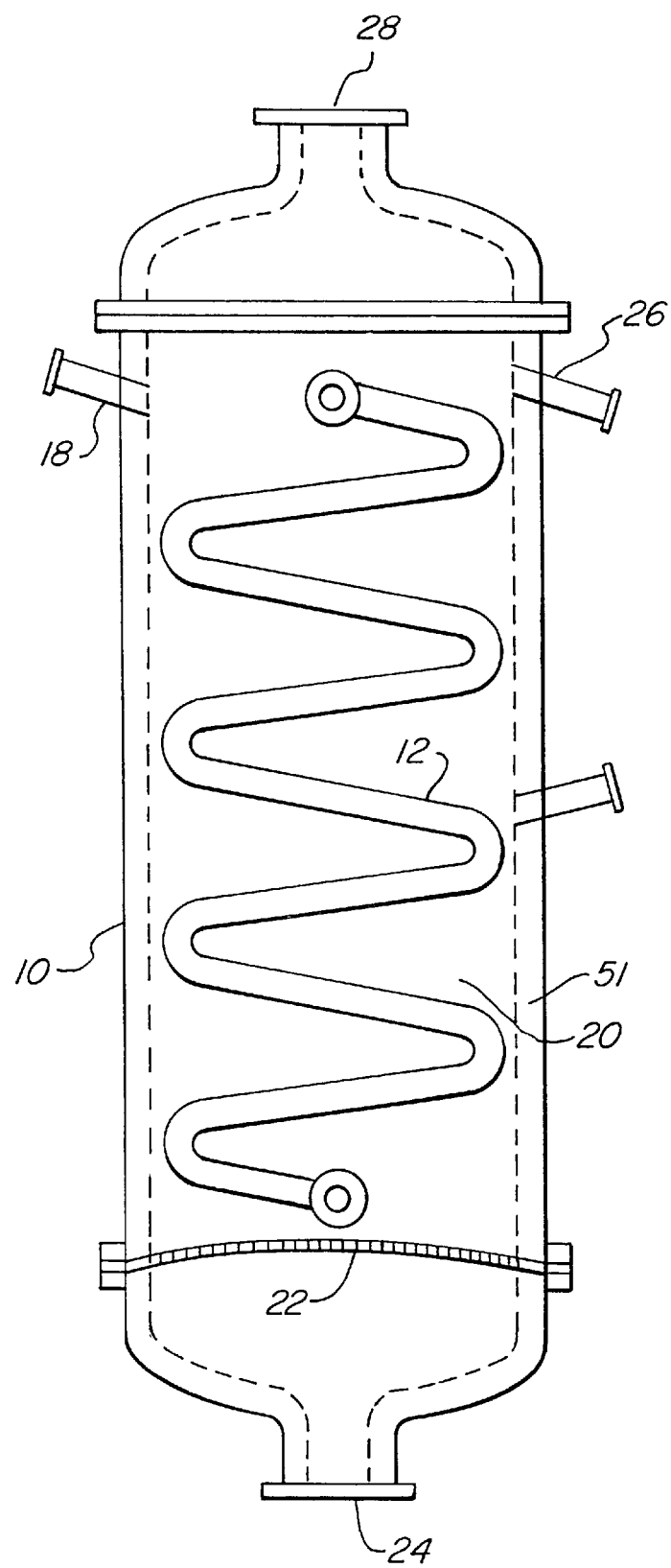
FIG. 7 is a partially schematic cross-sectional elevation of an alternative serpentine heat exchanger within a calcination vessel.
Figure 8:
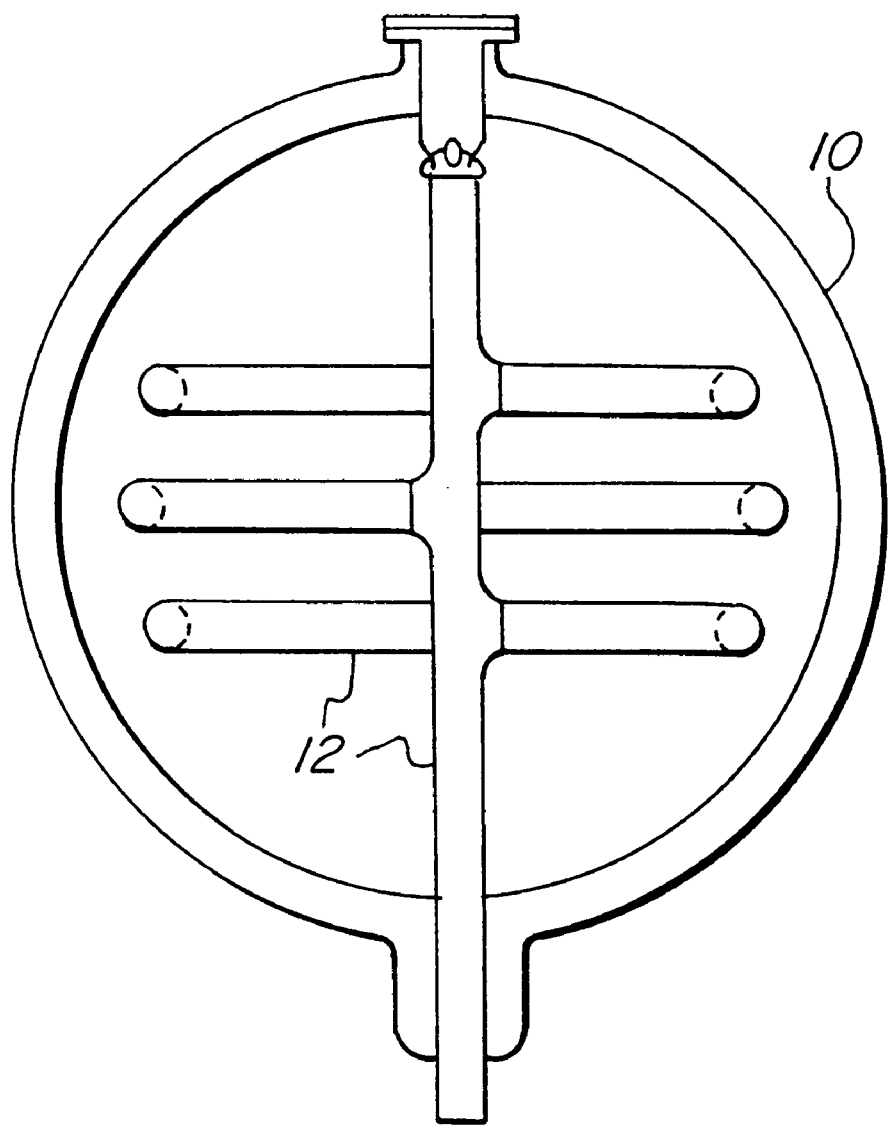
FIG. 8 is a partial schematic plan view of the heat exchanger and calcination vessel of FIG. 7.

FIGS. 3–8 illustrate various heat exchanger 12 configurations for use in a calcination vessel 10. In all cases, the heat exchanger is manufactured from INCONEL 600. FIGS. 3 and 4 illustrate a heat exchanger 12 which follows a serpentine path within the calcination vessel 10. FIGS. 5 and 6 illustrate manifolded heat exchanger 12 arrangements in which vertically disposed arms 48 of the heat exchanger 12 are joined by horizontally disposed pigtails 50. FIGS. 7 and 8 illustrate a vertically arranged serpentine heat exchanger 12 which is manifolded at top and bottom within a calcination vessel 10 which is lined with insulating refractory bricks or mortar 51.

Figure 9:
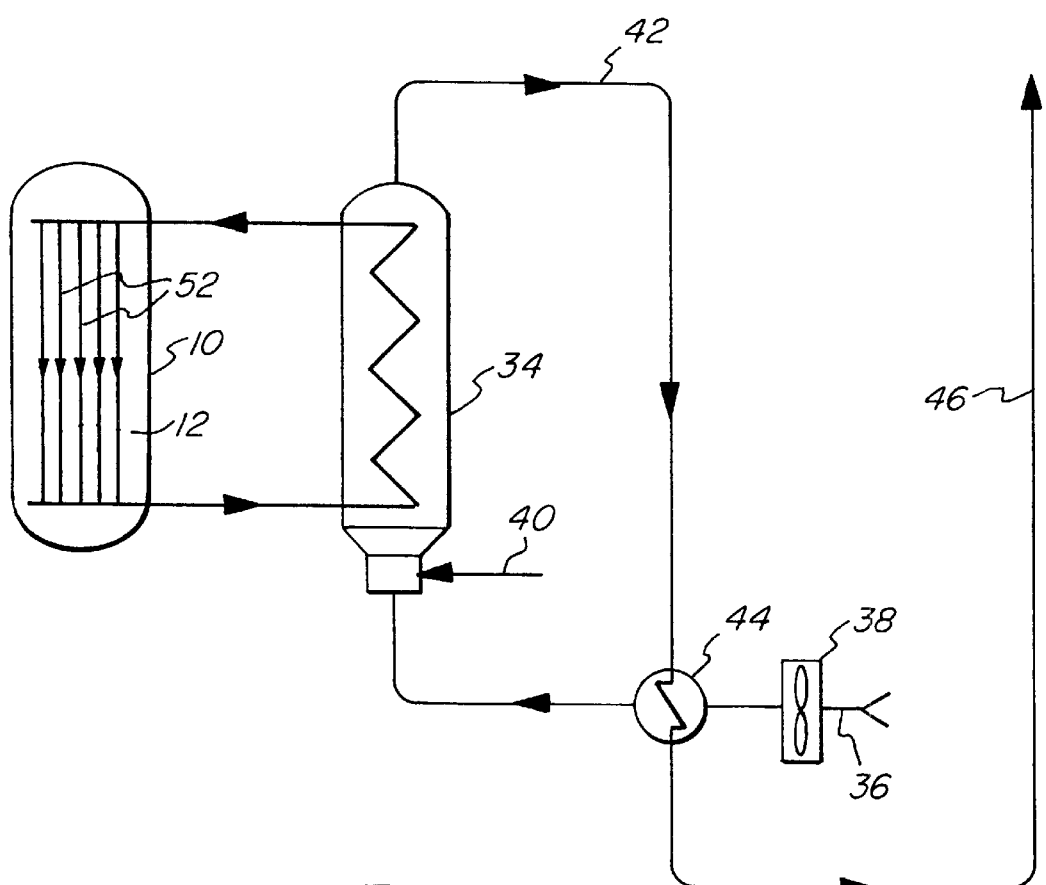
FIG. 9 is a schematic representation similar to FIG. 2 in which a thermosiphon effect is used to circulate the liquid metal.

Referring now to FIG. 9, Na flows downwardly through a series of heat exchange elements 52 which comprise heat exchanger 12. The Na is heated by a gas heater 34 of the kind described with reference to FIG. 2 and is circulated through the heat exchanger 12 by a thermosiphon effect with the sodium travelling upwardly through heater 34 as it is heated and downwardly through heat exchange elements 52 as it is cooled.

Figure 10:
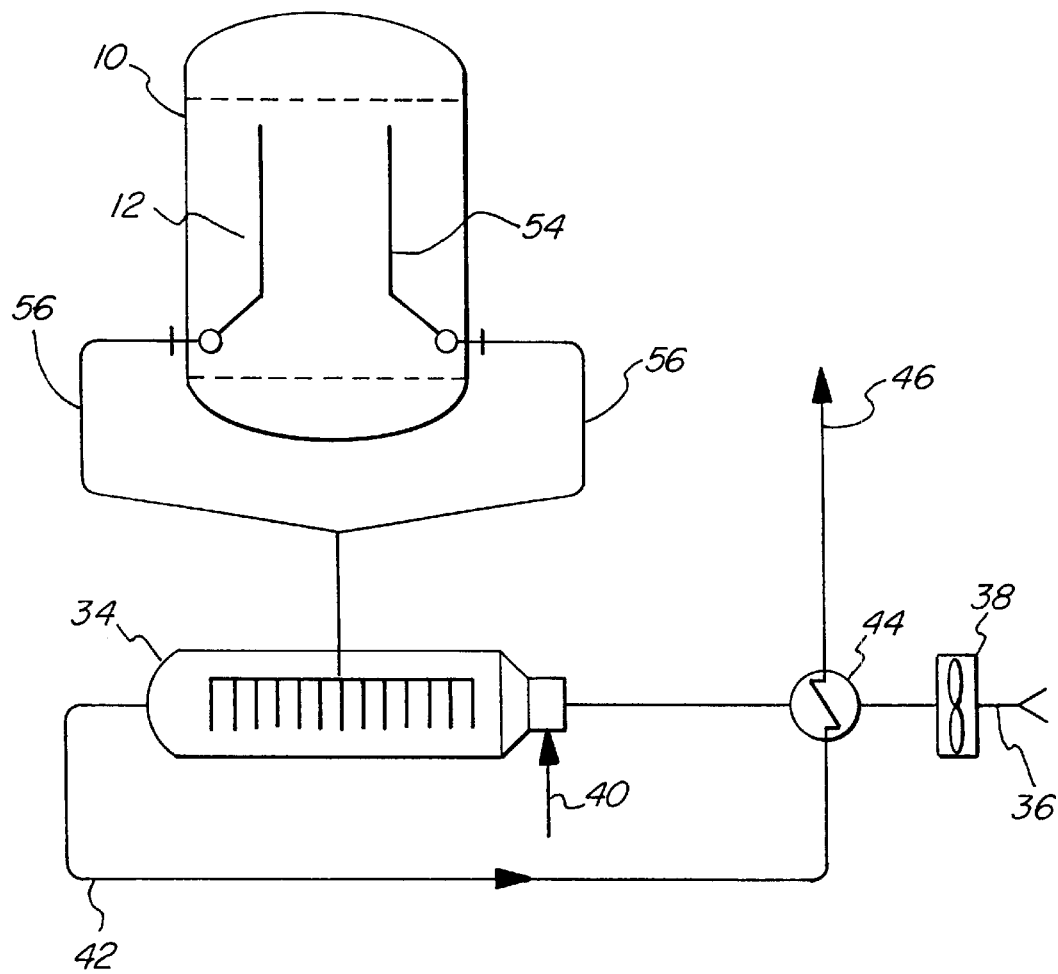
FIG. 10 is a schematic representation of a calcination vessel for single-stage calcination of $MgCl_2 \cdot 6NH_3$ to $MgCl_2$ which illustrates a portion of a heat pipe.

Referring now to FIG. 10, heat is transferred to material within the calcination vessel 10 by use of a heat pipe 54 having a heat exchanger portion 12. The heat pipe 54 is evacuated and contains Na both as a liquid and as a vapour. Liquid Na is heated to a vapour by gas heater 34 of the kind described with reference to FIG. 2. The Na vapour travels upwardly via pipes 56 into heat exchange portion 12 where heat is transferred through the walls of heat exchange portion 12 to material within the calcination vessel 10. The Na vapour condenses as it cools on the walls of the heat exchange portion 12 and returns to be re-heated to vapour by gas heater 34. A convection flow of Na is generated by its alternate vaporisation and condensation.

Figure 11:
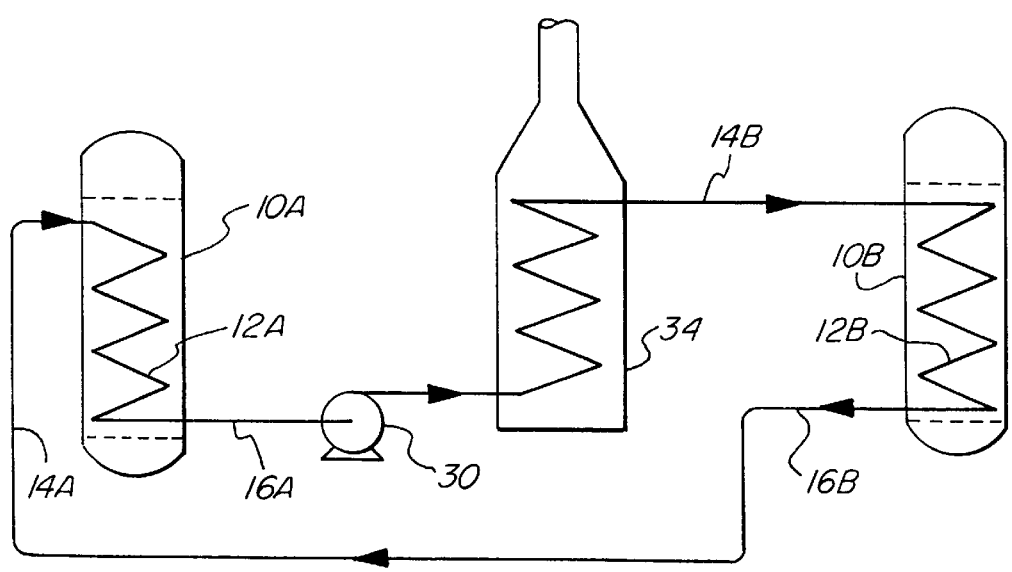
FIG. 11 is a schematic representation of two calcination vessels for two-stage calcination of $MgCl_2 \cdot 6NH_3$ to $MgCl_2$.

Referring finally to FIG. 11, two-stage calcination of $MgCl_2.6NH_3$ to $MgCl_2$ is illustrated in which first and second calcination vessels 10A and 10B respectively are utilised. The calcination vessels 10A and 10B are manufactured from INCONEL 600 and house serpentine heat exchangers 12A and 12B respectively. The calcination vessels 10A and 10B and the heat exchangers 12A and 12B are of the kind described in relation to FIGS. 7 and 8. Liquid Na enters heat exchanger 12A from stainless steel tube 14A at an entry temperature of approximately 550° C., flows through the heat exchanger 12A and exits first calcination vessel 10A to flow through stainless steel tube 16A at an exit temperature of approximately 300° C. Thereafter, the liquid Na is pumped to gas-fired heater 34 (of the kind described in relation to FIG. 2) by centrifugal pump 30 where it is heated to enter heat exchanger 12B via line 14B at a temperature of approximately 700° C. The liquid Na is recycled from heat exchanger 12B to heat exchanger 12A via line 16B which becomes line 14A at a temperature of approximately 550° C. This heat exchange loop results in fluidised bed temperatures in calcinations vessels 10A and 10B of approximately 220° C. and 480° C. respectively. Conventional pneumatic particle transfer techniques are used to introduce $MgCl_2.6NH_3$ into calcination vessel 10A, to remove $MgCl_2$ from calcination vessel 10B, and to transfer partially calcined material from calcination vessel 10A to calcination vessel 10B. In comparison with the single-stage calcination described in relation to FIG. 2, the two-stage calcination of FIG. 11 enables the combined surface areas of heat exchangers 10A and 10B to be approximately 80% of the surface area of heat exchanger 10 of FIG. 2.

What is claimed is:

1. A calcination apparatus comprising a calcination vessel through which particulate material to be calcined passes, said calcination vessel housing a heat exchanger with a heat exchange loop containing liquid metal heat exchange fluid, the heat exchange loop including a conduit for the liquid metal heat exchange fluid, said conduit having an outer surface, the liquid metal heat exchange fluid in the conduit being arranged to transfer heat to the calcinable material passing through the vessel, through the outer surface of the conduit, the heat being transferred coming from the liquid metal heat exchange fluid in the heat exchange conduit of the heat exchanger.

2. An apparatus as claimed in claim 1 further comprising heating means for elevating the temperature of the liquid metal heat exchange fluid in a portion of the heat exchange loop externally of the calcination vessel.

3. An apparatus as claimed in claim 2 wherein the heating means comprises a hydrocarbon fuel fired heater or an electric heater.

4. An apparatus as claimed in claim 2 further comprising a pump in the heat exchange loop for inducing flow of liquid metal heat exchange fluid through the heat exchange loop, the pump being downstream of the calcination vessel and upstream of the heating means.

5. An apparatus as claimed in claim 4 wherein the pump is a mechanical pump or an electromagnetic pump.

6. An apparatus as claimed in claim 1 wherein a portion of the conduit comprises a pipe having a serpentine passage within the calcination vessel or a series of pipes connected by manifolds or pigtails within the calcination vessel.

7. An apparatus as claimed in claim 2 wherein the heat exchanger comprises a series of heat exchange elements and the apparatus is arranged for the liquid metal heat exchange fluid to flow downwardly through the heat exchange elements under the influence of a thermosiphon effect.

8. An apparatus as claimed in claim 1 wherein the heat exchanger forms part of an evacuated heat pipe arranged to be heated externally of the calcination vessel for providing a convection flow of liquid metal within the heat pipe.

9. An apparatus as claimed in claim 1 wherein the apparatus comprises a series of calcination vessels, each of the series of calcination vessels being arranged to partially calcine the material.

10. An apparatus as claimed in claim 9 wherein the apparatus comprises a series of two or three calcination vessels.

11. An apparatus as claimed in claim 1 wherein the calcination vessel is a fluidised bed calcination vessel.

12. An apparatus as claimed in claim 1 wherein the liquid metal heat exchange fluid is selected from sodium, potassium, magnesium, lead, tin, mercury and alloys thereof.

13. A process for cacining a material to its anhydrous state in the calcination apparatus of claim 1, comprising indirectly transferring heat to the material to be calcined from the liquid metal heat exchange fluid flowing through the heat exchanger housed within the calcination apparatus, and wherein the heat transferred to said material calcines said material to its anhydrous state.

14. A process for the indirectly heated calcination of a particulate material to convert it to its anhydrous state and to liberate the vaporizable portion of said material, comprising:

a) fluidizing the particulate material with a gaseous fluidizing medium in a calcination apparatus housing a closed loop heat exchanger adapted to indirectly transfer heat to the particulate material by means of a liquid metal heat exchange fluid arranged to flow through the closed loop heat exchanger;

b) heating the fluidized particulate material flowing through the calcination apparatus in indirect heat exchange with the closed loop heat exchanger at a temperature sufficient to liberate the vaporizable portion of said particulate material in the form of gaseous vapor which exits the calcination apparatus with the gaseous fluidizing medium, and wherein the particulate material is converted to its anhydrous state; and c) returning the gaseous vapor to the calcination apparatus to serve as the fluidizing medium for the particulate material entering the calcination apparatus.

15. The process of claim 14, wherein the particulate material is magnesium chloride ammoniate.

16. The process of claim 15 wherein the particulate material is magnesium chloride hexammoniate.

17. The process of claim 14, wherein the calcination temperature varies from about 460° C. to 500° C.

18. The process of claim 16, wherein the calcination apparatus comprises a series of fluidized bed calcination vessels with ammonia introduced into each calcination vessel as a fluidizing gas, each of the series of calcination vessels being arranged to partially calcine the ammonium magnesium chloride hexammoniate.

19. The process of claim 18, wherein the calcination apparatus comprises a series of two calcination vessels, and wherein the temperature within the first calcination vessel varies from about 210° C. to 230° C., and the temperature within the second calcination vessel varies from about 460° C. to 500° C.

20. The process of claim 14, wherein the temperature of the closed loop heat exchanger varies from about 550° C. to 700° C.

21. The process of claim 14, wherein the particulate material is a magnesium compound.

22. A calcination apparatus comprising, a) a calcination vessel, b) a heat exchanger housed in the calcination vessel, the heat exchanger having a heat exchange loop pipe containing liquid metal heat exchange fluid and forming a conduit for the liquid metal heat exchange fluid, the conduit having an outer surface, whereby heat from the heat exchange loop pipe is transferred through the outer surface of the conduit by the liquid metal heat exchange fluid in the conduit to the material being calcined in the calcination vessel, c) a first opening in the upper portion of the calcination vessel adapted for entry of a particulate material to fall freely therein and become fluidized by a fluidizing gas, d) a second opening in the upper portion of the calcination vessel below the first opening adapted for the free-flowing fluidized particulate material to exit the calcination vessel, e) a third entry in the lower portion of the calcination vessel for entry of a fluidizing gas, and f) a fourth entry in the top portion of the calcination vessel for exit of the fluidizing gas.

\* \* \* \* \*

UNITED STATES PATENT AND TRADEMARK OFFICE
CERTIFICATE OF CORRECTION

PATENT NO. : 6,482,366 B1
DATED : November 19, 2003
INVENTOR(S) : Ivars Mirovics et al.

It is certified that error appears in the above-identified patent and that said Letters Patent is hereby corrected as shown below:

<u>Title page,</u>
Item [73], Assignee, change "Australian Magnesium Corporation PTY LTD" to
-- Australian Magnesium Operations PTY LTD --.

<u>Column 9,</u>
Line 7, change "cacining" to -- calcining --

Signed and Sealed this

Fifteenth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,482,366 B1
DATED        : November 19, 2003
INVENTOR(S)  : Ivars Mirovics et al.

It is certified that error appears in the above-identified patent and that said Letters Patent is hereby corrected as shown below:

<u>Title page,</u>
Item [73], Assignees, change "Australian Magnesium Corporation PTY LTD" to
-- Australian Magnesium Operations PTY LTD --.

<u>Column 9,</u>
Line 7, change "cacining" to -- calcining --

Signed and Sealed this

Twenty-sixth Day of August, 2003

JAMES E. ROGAN
*Director of the United States Patent and Trademark Office*